May 5, 1964 W. J. SCHRENK ETAL 3,131,910
METHOD AND APPARATUS FOR MIXING A PLURALITY OF VISCOUS FLUIDS
Filed April 4, 1962 3 Sheets-Sheet 2

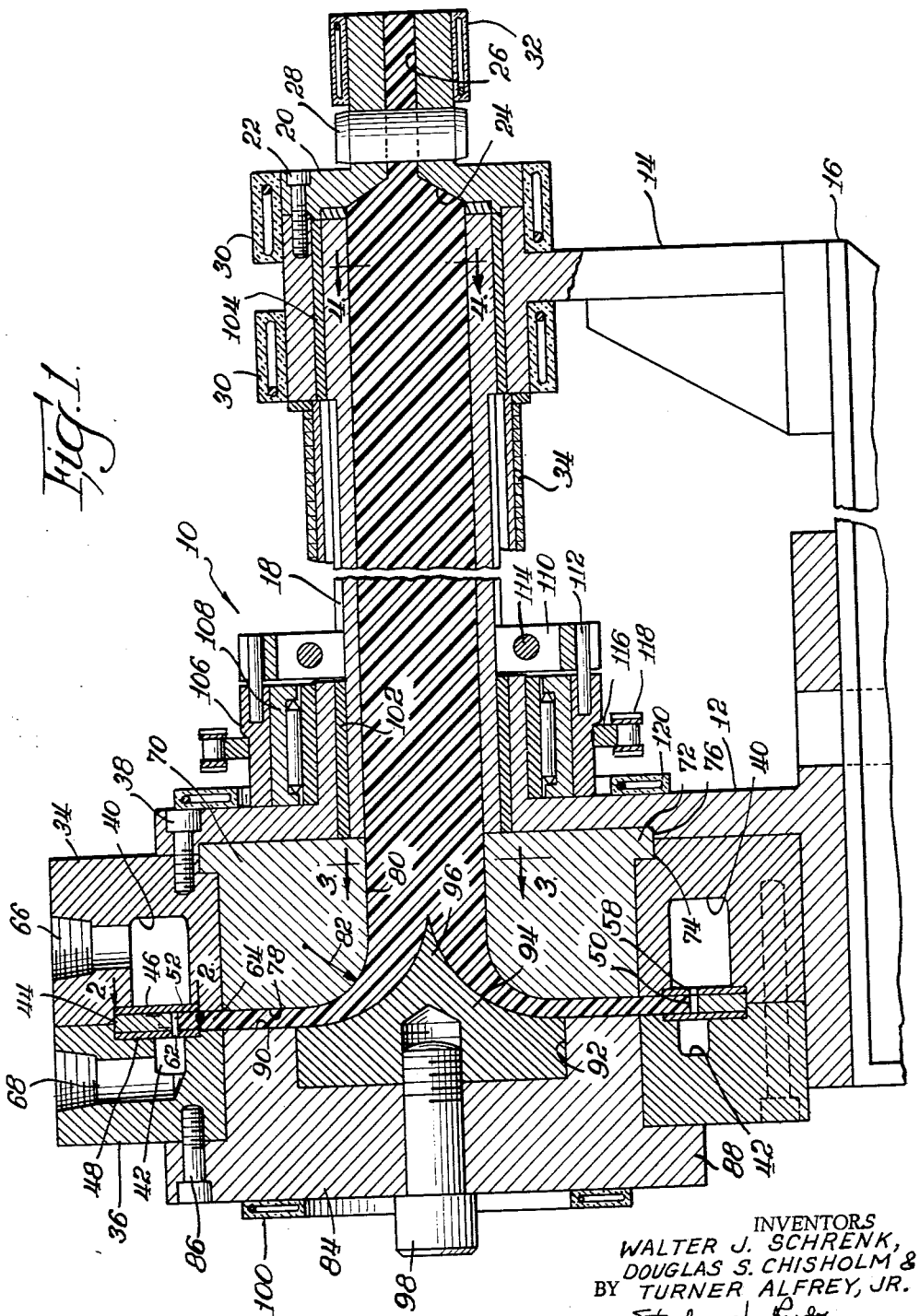

INVENTORS
WALTER J. SCHRENK,
DOUGLAS S. CHISHOLM &
BY TURNER ALFREY, JR.
ATT'YS.

INVENTORS
WALTER J. SCHRENK,
DOUGLAS S. CHISHOLM &
BY TURNER ALFREY, JR.

ATT'YS.

United States Patent Office 3,131,910
Patented May 5, 1964

3,131,910
METHOD AND APPARATUS FOR MIXING
A PLURALITY OF VISCOUS FLUIDS
Walter J. Schrenk, Bay City, and Douglas S. Chisholm
and Turner Alfrey, Jr., both of Midland, Mich., assignors to The Dow Chemical Company, Midland, Mich., a corporation of Delaware
Filed Apr. 4, 1962, Ser. No. 185,142
13 Claims. (Cl. 259—3)

This invention pertains to a method and apparatus for the continuous blending of diverse, viscous fluids.

In the continuous mixing or blending of two or more viscous fluids, it is desirable to accomplish the mixing with simple equipment and minimum energy input, while still attaining a very thorough mixing.

The method and the device of the subject invention achieves such desideratum by arranging the fluids in alternate, ribbon-like layers extending in radial planes around the circumference of a cylindrical member. The alternate layers are pumped through a toroidal transition piece and emerge into a mixing chamber, in the form of a pipe, or barrel, in such a way that the layers become sectors whose interfaces are radial lines extending from the center of the pipe. Mixing is accomplished merely by rotating the pipe as the fluids are pumped therethrough. The simultaneous rotation of the pipe and the differential axial velocity due to pumping, results in a distortion of the original radial interfaces into a spiral configuration with an accompanying increase in interfacial surface area. The result is a reduction between like interfaces until they become vanishingly thin, so that upon discharge from the mixer, a thoroughly mixed product is obtained having uniform viscosity and distribution characteristics.

It will be seen that in the mixer of the invention, no rotational shear of the fluids occurs since there is no annulus, and the only torque required is that needed to overcome bearing and seal friction. This makes the mixer especially well suited for fluids which have a tendency to degrade when subjected to shear forces. In addition, since the mixer has no internal boundary, the pressure drop is much less in comparison with mixers having an annular channel. Finally, cleanout of the mixer is made easier because of its simplified structure.

The present invention differs basically from that disclosed in the copending application of Walter J. Schrenk, Kenneth J. Cleereman, and Turner Alfrey, Jr., Serial No. 98,105, filed March 24, 1961, by the elimination of an inner cylindrical member, which is used to define the inner peripheral surface of an annulus in the apparatus of the copending application.

The main object of this invention is to provide a mixer for the continuous blending of a plurality of viscous fluids.

A more specific object is to provide a method and apparatus which is of simple construction and which requires minimum energy input.

Still another object of the invention is to provide a mixer for a plurality of viscous fluids wherein there is no rotational shear of the fluids during mixing, thus making the mixer especially well suited for use on fluids which have a tendency to degrade when subjected to shear forces.

Another object is to provide a mixer which is easy to clean out after use.

These and further objects and features of the invention will become more apparent from the following description and accompanying drawings wherein:

FIG. 1 is a vertical fore-shortened section view of a mixer embodying the principles of the invention;

FIG. 2 is a view generally as seen along line 2—2 in FIG. 1;

FIG. 5 is a fragmentary section view of a mixer identical with that of FIG. 1, but having a rotatable cone means.

Figure 3:
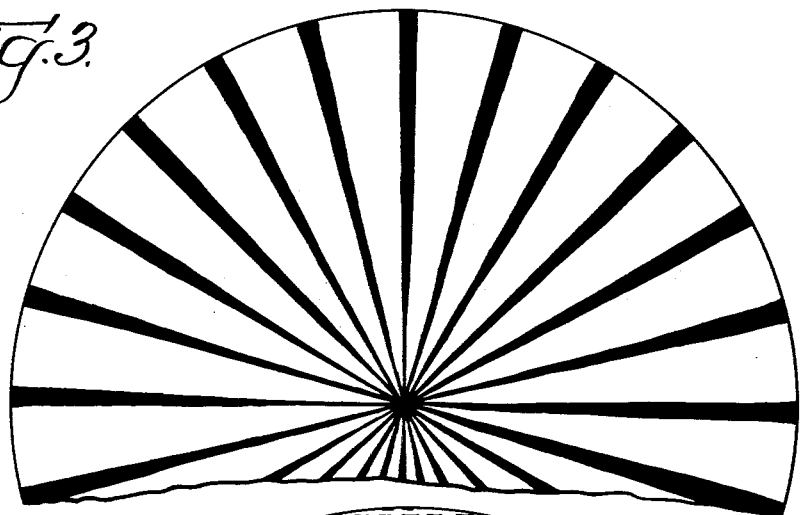
FIG. 3 is an enlarged view generally as seen along line 3—3 in FIG. 1 when the mixer is in operation.

Referring now to the drawings numeral 10 identifies a mixer or blender, which includes a rear bearing 12 and a front bearing 14, both being of the pedestal type arranged for mounting atop a stand 16, the upper portion only being shown. The bearings are adapted to horizontally support a mixing chamber, in the form of an open ended pipe, or barrel 18.

A nozzle 20 is arranged upon the forward end of the barrel 18, which nozzle is affixed to the front bearing 14, by fastening means, such as cap screws 22. The nozzle has a conical recess 24 on the inner surface, the major diameter of which coincides with the inner diameter of the barrel 18, while the minor diameter coincides with the diameter of a nozzle outlet passageway 26. A valve means 28 is arranged in the nozzle 20 to control flow of mixed plastic material therethrough. Heating means, in the form of band heaters 30 and 32, are arranged upon the external surface of the bearing 14 and nozzle 20, as shown. An induction heating coil assembly 34 is positioned upon the barrel 18.

A feedport block assemblage is provided which includes an inner feedport block 34, and an outer feedport block 36, said blocks being joined together and affixed to the rear bearing 12 by fastening means, such as cap screws 38. The blocks 34 and 36 are ring-like in form and have circular grooves, or recesses 40 and 42 respectively, formed in adjoining surfaces. A feedport assemblage, which includes an annular plate 44 and annular masks 46 and 48, on opposite sides of the plate 44, is interposed between the recesses 40 and 42. As best seen in FIG. 2, the feedport plate 44 is formed with a plurality of circumferentially arranged, equally spaced holes 50, and a plurality of circumferentially arranged, equally spaced holes 52. The holes 50 are of somewhat larger diameter than holes 52, and are at a greater radial distance than the latter. Each hole 50 and 52 is connected to a radially arranged slot 54 and 56 respectively, which slot extends to the inner peripheral edge of the plate. It will be noted that the slots 54 and 56, are in alternate, equally spaced, relationship.

The mask 46 has a plurality of holes 58, of like number and positioning as holes 50, while mask 48 has a plurality of holes 62 of like number and positioning as holes 52. The inner region of the blocks 34 and 36 are recessed to provide a circumferential opening, or passageway 64, which is of the same width as the plate 44. Inlet ports 66 and 68, formed in the blocks 34 and 36, are arranged to be in communication with the grooves 40 and 42 respectively, said ports being threaded for receipt of supply pipes (not shown).

A transition piece 70, which is ring-like in form, is adapted to be maintained in interfitting relationship within the inner feed port block 34, and is positionally maintained by abutment with the side of the rear bearing 12. A flange 72, formed on the piece 70, fits within recesses 74 and 76 provided in the piece 70 and rear bearing 12, respectively, the arrangement being such as to establish alignment of an inner surface 78 of the piece 70 with an edge of the passageway 64, as best seen in FIG. 1. The transition piece 70 is formed to provide an axially arranged hole 80, which has a rather large radius edge 82 leading from the surface 78, which hole is of the same diameter as the inner diameter of the barrel 18.

A disk-like plug 84 is adapted to be maintained in interfitting relationship within the outer feedport block 36, and is positionally maintained by fastening means, such as cap screws 86. A flange 88, formed on the plug 84, is arranged to abut the side surface of the feedport block 36, which arrangement is such as to establish alignment of an inner surface 90 of the plug with an edge of the passageway 64.

Mounted within an axial recess 92 formed on the inner surface of the plug 84, is a flow directing element in the form of a cone 94, which has a conical portion 96 projecting in the hole 80 of the transition piece 70. The portion 96 has a terminal edge which is in vertical alignment with the surface 90 of the plug 84. A cap screw 98 maintains the cone 94 in the recess 92. A ring heater 100 may be arranged on the outer surface of the plug 84.

The barrel 18 is rotatably mounted in bushing means 102 and 104 supported in the rear bearing 12 and front bearing 14, respectively. Rotation of the barrel 18 is achieved by means of a driver ring 106, supported upon the rear bearing 12 by way of a needle bearing 108, which driver ring 106 is connected to a yoke 110 by pins 112, the yoke being fixedly clamped upon the barrel 18, by means such as cap screws 114. A sprocket 116, secured to the driver ring 106, is arranged for engagement by a drive chain 118, which is driven by power means (not shown). A ring heater 120 may be placed against the side surface of the rear bearing 12.

Under certain conditions it may be found desirable to cause rotation of a cone in a direction opposite to rotation of the barrel 18. In FIG. 5, a modified cone arrangement is shown, which may be used for such purpose.

A cone 122 is shown mounted for rotation in a plug 124, the latter being secured to the outer feedport block 36, by fastening means such as cap screws 126. The cone 122, has a shaft 126, rotatably supported in the plug 124, which shaft projects from the side of the plug and has a sprocket 128 secured thereto. A drive chain 130, arranged for engagement of the sprocket, is driven by a power means (not shown), in a direction opposite to the direction of rotation of the barrel 18. In all other respects, the mixer utilizing such a cone driving arrangement is the same as mixer 10 described hereinbefore, as the use of like numerals for identification of parts suggests.

The operation of the device above described is quite simple. Assume that a white pigmented polystyrene, is pumped into the groove 40, while a black pigmented polystyrene is pumped into the groove 42. The liquids will pass through the feedport assemblage and enter the passageway 64 in alternate ribbon-like layers to form a plurality of circumferentially arranged sectorial areas which converge at the axis of the barrel 18, as seen in FIG. 3.

Figure 4:
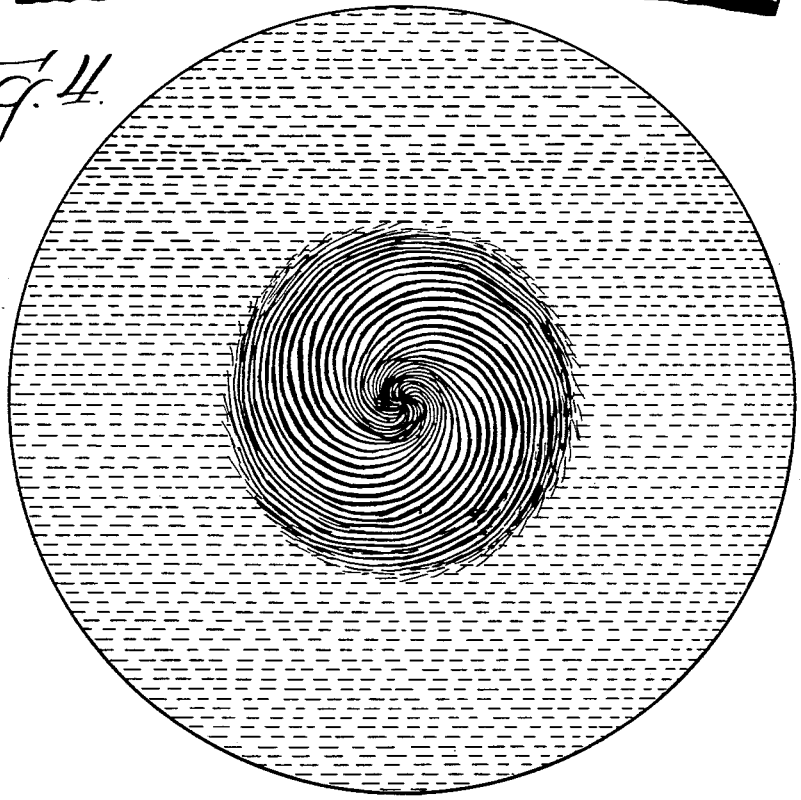
FIG. 4 is an enlarged view generally as seen along line 4—4 in FIG. 1 when the mixer is in operation.

It will be understood that the number of sectorial areas in FIG. 3 is merely illustrative; in actual practice, the number may be many more than illustrated. Mixing is accomplished by rotating the barrel 18 relative to the feedports as the viscous fluids are being pumped through the barrel. For viscous fluids, the axial velocity due to pumping varies at different radial positions in the barrel, thus causing a spiral type distortion of the original radial interfaces with an accompanying reduction in distance between interfaces. Near the center or axis of the barrel, very little distortion occurs, however, the material in such location has been well mixed by virtue of the feed geometry wherein the interfaces converge to zero distance at such location. The condition of the mixed fluids is illustrated in FIG. 4, the horizontal dotted lines representing the color grey, which, of course, will be the color of the entire mixture, the spiral lines in said figure being merely illustrative of the mix pattern.

The spiral distortion is maximum near the circumference of the barrel and the fluids in such region are mixed very thoroughly as they are pumped through the rotating barrel. It should be noted that the rotational velocity of the barrel is relative to the feedports, and the mixer would function equally well if the barrel was stationary and the feedport assemblage was to be rotated.

The number and dimensions of the feedport slots 54 and 56, will depend upon various factors, such as material flow rate, types and characteristics of materials being mixed, pressures being utilized, etc. and may be established in any given case by application of well known engineering design techniques.

For example, in the apparatus illustrated, there were 100 of each of the slots 54 and 56 (and associated feed holes 58 and 62, respectively). Material feeders (not shown) were set to supply 36 lbs./hr. of white pigmented polystyrene and 4 lbs./hr. of black pigmented polystyrene, to a mixer having a 2" I.D. barrel 18, two feet long, rotating at 34 r.p.m. The polymers being mixed were heated to a temperature of 450° F., and maintained at that temperature during mixing, while the pressure applied to the polymers was within a range of 250 to 280 p.s.i. This apparatus gave very excellent mixing results, which would compare favorably with mixers of other known types.

It will be found that a mixer embodying the principles of the invention, as above described, will satisfy the objectives set forth hereinbefore.

The foregoing description has been given in detail without thought of limitation since the inventive principles involved are capable of assuming other forms without departing from the spirit of the invention or the scope of the following claims.

What is claimed is:

1. Apparatus for mixing a plurality of viscous fluids comprising in combination, a cylindrical mixing chamber having open ends, feedport means arranged to introduce fluids into one end of the mixing chamber so that the liquids are arranged in alternate repetitive sequence defining sectors which converge generally at the axis of the mixing chamber, and means to effect relative rotation between the mixing chamber and the feedport means.

2. Apparatus for mixing a plurality of viscous fluids comprising in combination, a barrel, feedport means arranged to introduce fluids into one end of the barrel so that the liquids are arranged in alternate repetitive sequence defining sectors which converge at the axis of the barrel, and means to rotate the barrel.

3. Apparatus for mixing a plurality of viscous fluids comprising in combination, a barrel, feedport means arranged to introduce fluids into one end of the barrel so that the liquids are arranged in alternate repetitive sequence defining sectors which converge at the axis of the barrel, a fluid flow directing element which extends in the direction of the barrel, and means to apply a rotational torque to the barrel.

4. Apparatus for mixing a plurality of viscous fluids comprising in combination, a barrel, feedport means arranged to introduce fluids into one end of the barrel so that the liquids are arranged in alternate repetitive sequence defining sectors which converge at the axis of the barrel, a fluid flow directing element arranged at one end of the barrel and adapted to direct the fluid from said feedport means in the direction of the barrel, and means to apply a rotational torque to the barrel.

5. Apparatus for mixing a plurality of viscous fluids comprising in combination, a rotatable open-ended barrel, a feedport block assemblage at one end of the barrel said assemblage being formed to provide two circumferential grooves, fluid inlet ports connected to each groove, a feedport assemblage interposed between the grooves, said feedport assemblage including an annular plate and a coextensive mask on each side of the plate, one of said masks connecting one of the grooves with a first set of radial slots arranged in the plate, the other of said masks connecting the other groove with a second set of radial slots arranged in the plate and interposed in alternate manner with the first set of radial slots, and means to connect the ends of each set of radial slots with the interior of the barrel.

6. Apparatus for mixing a plurality of viscous fluids comprising in combination, a rotatable open-ended barrel, a feedport block assemblage at one end of the barrel, said assemblage being formed to provide two circumferential grooves, fluid inlet ports connected to each groove, a feedport assemblage interposed between the grooves, said feedport assemblage including an annular plate and a coextensive mask on each side of the plate, one of said masks connecting one of the grooves with a first set of radial slots arranged in the plate, the other of said masks connecting the other groove with a second set of radial slots arranged in the plate and interposed in alternate manner with the first set of radial slots, a transition piece having a curved surface extending between a line in vertical alignment with the first side of the annular plate and the inside diameter of the barrel, and means including a cone-like element having a curved surface extending between aline in vertical alignment with the other side of the annular plate and the axis of the barrel.

7. Apparatus according to claim 6, wherein bearing means are arranged to support said barrel in horizontal position.

8. Apparatus according to claim 7, wherein a sprocket is arranged upon the barrel for engagement by a drive chain for rotational movement of the barrel.

9. A method for mixing a plurality of viscous fluids comprising the steps of, arranging said liquids in alternate sequence about a circumference to define a plurality of sectors which converge at a central point, and applying a rotating fluid moving force about the circumference of said sectors, while simultaneously moving the liquids along a longitudinal path.

10. Apparatus for mixing a plurality of viscous fluids comprising in combination, a barrel, feedport means arranged to introduce fluids into one end of the barrel so that the liquids are arranged in alternate repetitive sequence defining sectors which converge at the axis of the barrel, a fluid flow directing element arranged at one end of the barrel and adapted to direct the fluid from said feedport means in the direction of the barrel, means to rotate the fluid flow directing element, and means to rotate the barrel in a direction opposite to that of the fluid flow directing element.

11. Apparatus for mixing a plurality of viscous fluids comprising, in combination, a barrel feed port, means arranged to introduce fluids into one end of the barrel so that the liquids are arranged in alternate repetitive sequence defining sectors which converge generally at the axis of the barrel, a fluid flow directing element which extends in the direction of the barrel, means to rotate the fluid flow directing element, and means to apply a rotational torque to the barrel.

12. Apparatus for mixing a plurality of viscous fluids comprising, in combination, a barrel feed port, means arranged to introduce fluids into one end of the barrel so that the liquids are arranged in alternate repetitive sequence defining sectors which converge generally at the axis of the barrel, a fluid flow directing element which extends in the direction of the barrel, means to rotate the fluid flow directing element, and means to rotate the barrel in a direction opposite to that of the fluid flow directing element.

13. A method for mixing a plurality of viscous fluids, comprising the steps of, arranging said liquids in alternate sequence about a periphery to define a plurality of sections which converge about a central point, and applying a rotating fluid moving force about the periphery of said sections while simultaneously moving the liquids along a longitudinal path.

References Cited in the file of this patent

UNITED STATES PATENTS

| | | |
|---|---|---|
| 1,935,884 | Loomis et al. | Nov. 21, 1934 |
| 1,988,743 | MacKenzie | Jan. 22, 1935 |